United States Patent
Chen et al.

(10) Patent No.: US 8,958,925 B2
(45) Date of Patent: Feb. 17, 2015

(54) LANE CURVATURE DETECTION SYSTEM BY UTILIZING VEHICULAR AND INERTIAL SENSING SIGNALS

(71) Applicant: Automotive Research & Test Center, Changhua County (TW)

(72) Inventors: Shun-Hung Chen, Changhua County (TW); Chan-Wei Hsu, Changhua County (TW); Po-Kai Yu, Changhua County (TW)

(73) Assignee: Automotive Research and Test Center, Changhua County (TW)

( * ) Notice: Subject to any disclaimer, the term of this patent is extended or adjusted under 35 U.S.C. 154(b) by 0 days.

(21) Appl. No.: 13/793,510

(22) Filed: Mar. 11, 2013

(65) Prior Publication Data

US 2014/0142780 A1    May 22, 2014

(30) Foreign Application Priority Data

Nov. 20, 2012   (TW) .............................. 101143196 A

(51) Int. Cl.
*G06F 17/00* (2006.01)
*G06K 9/00* (2006.01)
*B60W 40/072* (2012.01)

(52) U.S. Cl.
CPC ......... *G06K 9/00798* (2013.01); *B60W 40/072* (2013.01); *B60T 2201/08* (2013.01); *B60W 2520/06* (2013.01); *B60W 2520/10* (2013.01); *B60W 2540/18* (2013.01)

USPC ............................................... 701/1; 340/438

(58) Field of Classification Search
USPC .......... 701/1, 65, 41, 42; 455/456.1; 348/148; 382/103; 340/435; 702/155
See application file for complete search history.

(56) References Cited

U.S. PATENT DOCUMENTS

| | | | | |
|---|---|---|---|---|
| 2003/0072471 | A1* | 4/2003 | Otsuka et al. .................. | 382/103 |
| 2007/0032245 | A1* | 2/2007 | Alapuranen ................ | 455/456.1 |
| 2010/0002911 | A1* | 1/2010 | Wu et al. ........................ | 382/104 |
| 2011/0066329 | A1* | 3/2011 | Wakayama et al. ............. | 701/42 |
| 2012/0062747 | A1* | 3/2012 | Zeng .............................. | 348/149 |

FOREIGN PATENT DOCUMENTS

JP    2006119144   *  5/2006   ............... G01C 7/04

* cited by examiner

*Primary Examiner* — Marthe Marc-Coleman
(74) *Attorney, Agent, or Firm* — Muncy, Geissler, Olds & Lowe, P.C.

(57) ABSTRACT

A lane curvature detection system by utilizing vehicular and inertial sensing signals, which utilizes a speed detector, a steering wheel angle sensor, and a driving direction detector, to measure vehicle signals, such as the speed information, steering wheel angle, and driving direction of a vehicle, to estimate a lane curvature for the vehicle, and transmits said lane curvature to following vehicles for reference through a wireless transmission module. The lane curvature can be used to correct a lane curvature model, to increase accuracy of estimation.

9 Claims, 3 Drawing Sheets

LANE CURVATURE DETECTION SYSTEM BY UTILIZING VEHICULAR AND INERTIAL SENSING SIGNALS

BACKGROUND OF THE INVENTION

1. Field of the Invention

The present invention relates to a technology of lane curvature detection, and in particular to a lane curvature detection system by utilizing vehicular and inertial sensing signals.

2. The Prior Arts

In order to safeguard driving safety, in particular when passing through the bend of the road, the driver has to slow down the vehicle speed and pay attention to the road, otherwise the vehicle has the probability to get out of control. In this respect, the driver's experience is important. Also, the warning and information provided by instruments is helpful. For example, the lane radius of curvature can be estimated in advance, to compute the appropriate speed limit for driving through the bend. Then, the information is provided to the driver to avoid dangers.

Presently, most of the detection approach of road radius is using camera to detect the traffic lane markings. However, this approach is liable to be affected by the following environment factors, to make the results of the radius of curvature detection useless. For example, the traffic lane markings are unclear; traffic lane width is too wide; thus the image of the traffic lane markings can not be obtained; a steep slope making the images of the traffic lane markings not able to be detected; the traffic lane markings in front are shielded by a large size vehicle; light illumination too dark or too bright to obstruct image fetching; traffic lane marking image can not be fetched due to the shade of a tree or a big building; or even the traffic lane markings do not exist at all. The conditions mentioned above will make the image obtained through the visual device not clear enough to calculate the radius of the road.

Therefore, the existing methodology of lane curvature detection is needed to improve.

SUMMARY OF THE INVENTION

In view of the problems and shortcomings of the prior art, the present invention provides a lane curvature detection system utilizing vehicular and inertial sensing signals to overcome the drawbacks and shortcomings of the prior art.

The major objective of the present invention is to provide a lane curvature detection system utilizing vehicular and inertial sensing signals. Wherein, it utilizes a speed detector, a steering wheel angle sensor, or a driving direction detector to detect signals to estimate the turning curvature of the vehicle.

The other objective of the present invention is to provide a lane curvature detection system utilizing vehicular and inertial sensing signals. Wherein, the estimated curvature of the bend is transmitted to the following vehicle for reference via a wireless transmission module.

In order to achieve the above objective, the present invention provides a lane curvature detection method utilizing vehicular and inertial sensing signals. That is used to detect the driving direction, the speed information, and the steering wheel angle of a vehicle. Also, it utilizes the driving direction and the speed information to formulate a lane curvature model in a processor, to estimate lane curvature. And then, it utilizes the speed information and the steering wheel angle to make another estimation of the lane curvature. Finally, a descriptive statistics approach is utilized to correct the lane curvature.

In addition, the present invention provides a lane curvature detection system utilizing vehicular and inertial sensing signals, including: a vehicle signal detection module; a processor; and a wireless transmission module. Wherein, the vehicle signal detection module detects driving direction, speed information, and steering wheel angle of a vehicle. The processor is connected to the vehicle signal detection module, to use the speed information, and driving direction to formulate a lane model, to estimate the road curvature based on Ackermann steering principle. It also utilizes the speed information, and the steering wheel angle to make another estimated lane curvature via extended Kalman filter (EKF) method, and then it utilizes a descriptive statistics method to correct the lane curvature. The wireless transmission module is connected to the processor, to transmit the corrected lane curvature to at least a following vehicle for reference.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a lane curvature detection system by utilizing vehicular and inertial sensing signals. It can be used in an all-weather environment to detect the radius of road, and extended Kalman filter mechanism, to achieve curvature estimation and vehicle turning trajectory prediction.

Figure 1:
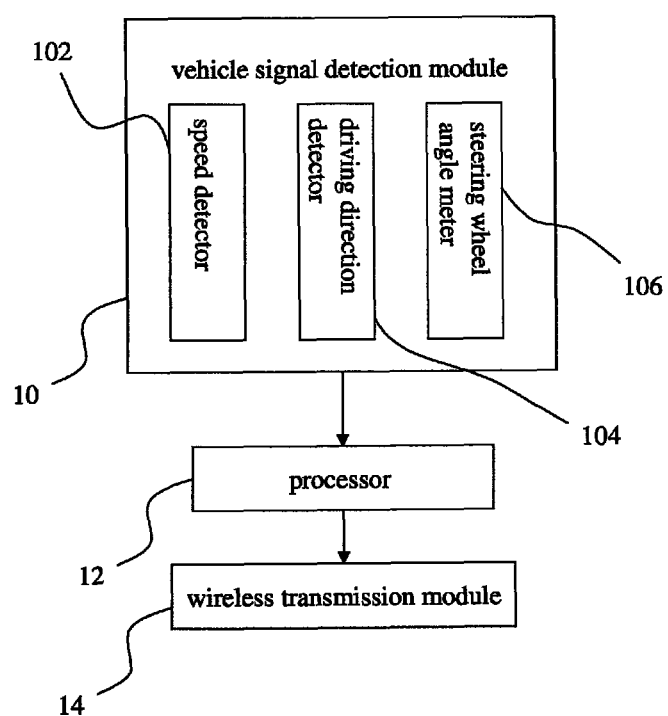
FIG. 1 is a block diagram of a lane curvature detection system by utilizing vehicular and inertial sensing signals according to the present invention.

Refer to FIG. 1 for a block diagram of a lane curvature detection system utilizing vehicle signals according to the present invention. As shown in FIG. 1, the lane curvature detection system includes: a vehicle signal detection module 10, a processor 12, and a wireless transmission module 14. The vehicle signal detection module 10 includes a speed detector 102, a driving direction detector 104, and a steering wheel angle sensor 106, and they are used to detect the vehicle velocity, vehicle heading angle, and steering wheel angle, respectively. Wherein, the speed detector 102 can be a wheel speed sensor, an accelerometer, GPS, or other sensors capable of detecting vehicle speed and acceleration; and the driving direction detector 104 can be a gyroscope or GPS. The processor 12 is connected to the vehicle signal detection module 10, and it utilizes the speed information, the driving direction, and the steering wheel angle to estimate lane curvature. It first utilizes the driving direction and the speed information to formulate a lane curvature model to estimate the lane curvature based on Ackermann steering principle. Meanwhile, it utilizes the speed information and the steering wheel angle to perform another estimation of the lane curvature through extended Kalman filter method. Then, it utilizes a descriptive statistics method to correct the lane curvature. The wireless transmission module 14 is connected to the processor 12, to transmit the corrected lane curvature to at least a following vehicle for reference.

Figure 2:
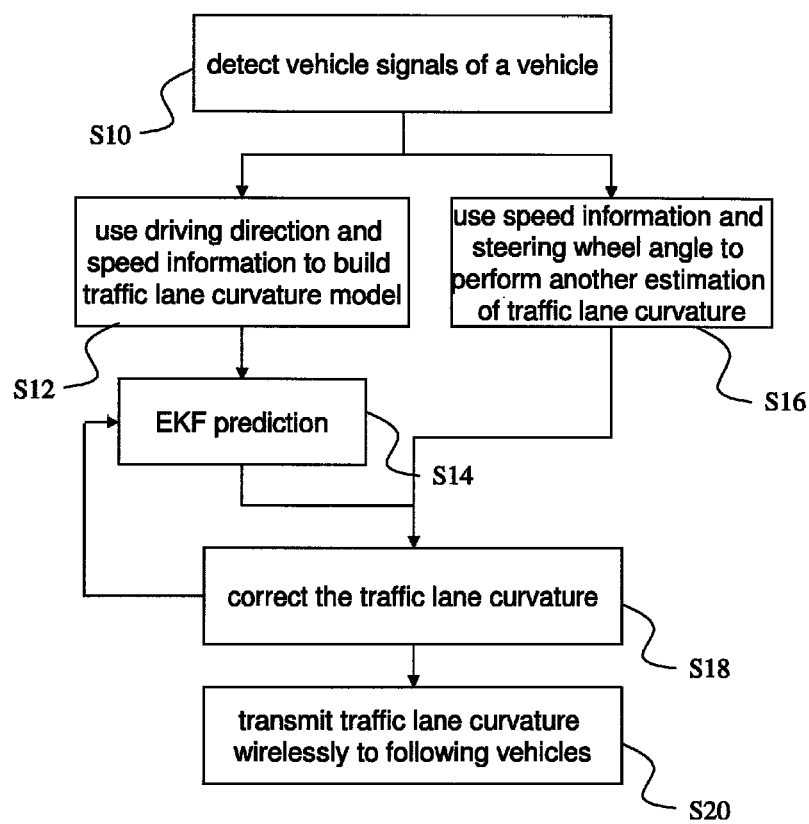
FIG. 2 is a flowchart of the steps of a lane curvature detection method by utilizing vehicular and inertial sensing signals according to the present invention.

Next, refer to FIG. 2 for a flowchart of the steps of a lane curvature detection method utilizing vehicle signals according to the present invention. As shown in FIG. 2, in step S10, the driving direction detector, the speed detector, and the steering wheel angle sensor detect respectively the vehicle heading angle, speed information, and steering wheel angle of a vehicle, while the speed information is the speed of the front wheels. Next, as shown in step S12, in a processor, utilize the vehicle heading angle and speed information to formulate a lane curvature model. Then, in step S14, utilize an Extended Kalman filter (EKF) to predict a lane curvature. Subsequently, as shown in step S16, use the speed information and steering wheel angle to make another estimation of lane curvature. Then, in step S18, utilize a descriptive statistics method to correct the estimated lane curvature, to complete the estimation of lane curvature. Finally, as shown in step S20, transmit the estimated and corrected lane curvature to the following vehicles wirelessly, and the wireless transmission is realized through Dedicated Short Range Communication (DSRC).

Figure 3:
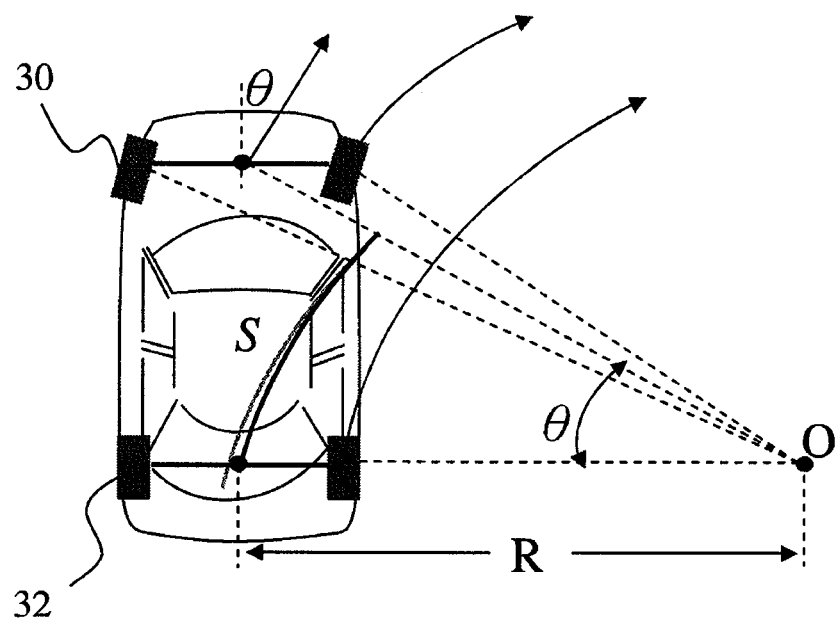
FIG. 3 is a schematic diagram of arc length and turning angle when a vehicle entering into a bend.

The other estimation of lane curvature mentioned in step S16 is described in detail as follows. Wherein, curvature is defined as the radius measured per arc length, with their ratio as the curvature. As shown in FIG. 3, suppose that the vehicle is a rigid body the speed sensor is used to estimate through integration the arc length S when a vehicle entering into a bend. Then, utilize a steering wheel angle sensor to measure a steering wheel angle $\lambda$(deg), to obtain the vehicle turning angle $\theta$(deg), namely the deflection angle of the front wheels 30. The curvature is defined as in equation (1) as follows:

$$\kappa_1 = \frac{1}{R} = \frac{\theta}{S} \approx \frac{\Delta\theta}{\Delta S} \qquad (1)$$

where $$\theta = \frac{\lambda}{N},$$

N is ratio coefficient (a constant for each vehicle), to obtain $$\Delta\theta = \frac{\sum_{i=1}^{T} \theta_i}{\Delta T},$$

T is sampling time.

Then, calculate the motion trajectory equation of center points of the left and right rear wheels, suppose w is width of vehicle, l is distance between axes, then the motion trajectory equation of center points of the rear wheel 32 is as shown in Equation (2) as follows:

$$\text{left rear wheel: } \begin{cases} x_{rL}(t) = \left(l \cdot \cot\theta - \frac{w}{2}\right) \cdot \sin\left(\frac{v \cdot \sin\theta}{l} t\right) \\ y_{rL}(t) = -\left(l \cdot \cot\theta - \frac{w}{2}\right) \cdot \cos\left(\frac{v \cdot \sin\theta}{l} t\right) + l \cdot \cot\theta \end{cases} \qquad (2)$$

$$\text{right rear wheel: } \begin{cases} x_{rR}(t) = \left(l \cdot \cot\theta + \frac{w}{2}\right) \cdot \sin\left(\frac{v \cdot \sin\theta}{l} t\right) \\ y_{rR}(t) = -\left(l \cdot \cot\theta + \frac{w}{2}\right) \cdot \cos\left(\frac{v \cdot \sin\theta}{l} t\right) + l \cdot \cot\theta \end{cases}$$

while the motion trajectory equation of center points of the rear axis is as shown in the following Equation (3):

$$\begin{cases} x_r(t) = l \cdot \cot\theta \cdot \sin\left(\frac{v \cdot \sin\theta}{l} t\right) \\ y_r(t) = -l \cdot \cot\theta \cdot \cos\left(\frac{v \cdot \sin\theta}{l} t\right) + l\cot\theta \end{cases} \qquad (3)$$

hereby obtaining arc length $$S = \int_0^T (x_r^2 + y_r^2)^{\frac{1}{2}} dt \Rightarrow \Delta S = (x_r^2 + y_r^2)^{\frac{1}{2}} \times \Delta T$$

Therefore, another estimation of lane curvature can be made as shown in the following Equation (4):

$$\kappa_1 = \frac{\rho(e_s + f_s)}{v^2} \qquad (4)$$

where $e_s$ is the superelevation of the road, $f_s$ is a lateral friction coefficient of a tire, $\rho$ is a parameter, and that can be expressed as $$\frac{\sum_{i=0}^{n} \lambda_i \cdot \Delta S}{\Delta T^2 \cdot N}.$$

V is vehicle speed, it can be $$\frac{v_L + v_R}{2}$$

at low speed, while the value at high speed can be obtained through a speed detector.

In step S12 of formulating a lane curvature model, the second order equation of the lane curvature quasi model is as shown in Equation (5) as follows:

$$y_r(t) = \left(\frac{\kappa_2(t)}{2}\right)x_r^2(t) + \theta(t)x_r(t) + \varepsilon + y_{r0} \qquad (5)$$

Figure 4:
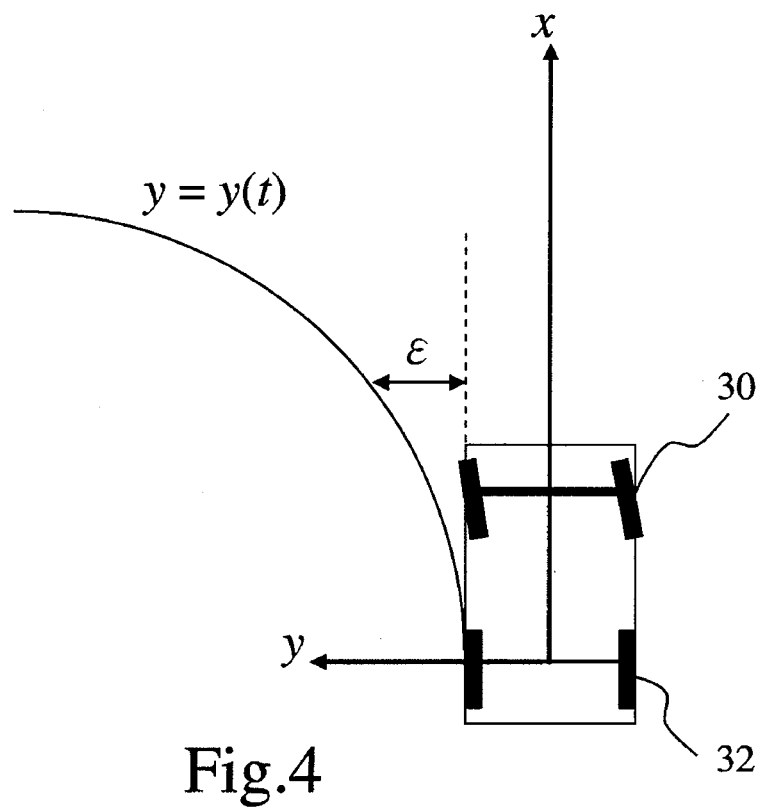
FIG. 4 is a schematic diagram of driving length and turning angle of rear wheels of a vehicle in x axis and y axis direction.

To augment the lane curvature into lane model, $x_r$ is a rear wheel position, $\varepsilon$ is lane deflection amount (displace difference between vehicle center point and traffic lane), $y_{r0}$ is a lateral initial position '$\kappa_2$ is a lane curvature. Meanwhile, refer to FIG. 4, to obtain driving length and turning angle of rear wheel 32 in x axis and y axis directions as shown in the following Equation (6). Herein, the driving trajectory of the rear wheel 32 is assumed as linear, but in reality the bend angle is close to linear but not completely linear. Therefore, the approximation values are obtained through the following equations:

$$\begin{cases} x_r(t) = \frac{\Delta T}{2}(v_L(t) + v_R(t)) \times \cos\theta + x_{r0} \\ y_r(t) = \frac{\Delta T}{2}(v_L(t) + v_R(t)) \times \sin\theta + y_{r0} \\ \frac{\kappa_2(t)}{2}x_r^2(t) = y_r(t) - \theta(t)x_r(t) - \varepsilon - y_{r0} \end{cases} \quad (6)$$

where $v_R$ and $v_L$ represent respectively speeds of the right and left rear wheels 32, while $\kappa_2/2$ is a variable.

Substitute equation (6) into the matrix, to establish a lane curvature model as shown in the following equation (7), to obtain the curvature statuses in x axis and y axis directions per unit time as follows:

$$\begin{bmatrix} x_r(t) \\ y_r(t) \\ \kappa_2(t) \end{bmatrix} = \begin{bmatrix} \frac{\Delta T}{2}(v_L(t) + v_R(t))\cos\theta + x_{r0} \\ \frac{\Delta T}{2}(v_L(t) + v_r(t))\sin\theta + y_{r0} \\ \frac{2}{x_r^2(t)}(y_r(t) - \theta(t)x_r(t) - \varepsilon) \end{bmatrix} = F(x) + Gu + W \quad (7)$$

where $$F(x) = \begin{bmatrix} 0 \\ 0 \\ \frac{2(y_r(t) - \varepsilon)}{x_r^2(t)} - \frac{-2\theta}{x_r(t)} \end{bmatrix}, G = \begin{bmatrix} \frac{\Delta T\cos\theta}{2} & \frac{\Delta T\cos\theta}{2} \\ \frac{\Delta T\sin\theta}{2} & \frac{\Delta T\sin\theta}{2} \\ 0 & 0 \end{bmatrix}$$

Then, in step S14, the given lane detection system of an extended Kalman filter is x=F(x)+Gu+W, z=H(x)' where $x=[x_r \ y_r \ K_2]^T$ is the system status '$u=[v_L \ v_R]^T$ is a variable control input, z is a system measurement output, F is system equation matrix, G is a control input matrix, and W is white noise. The Jacobian matrix of system equation matrix can be obtained through the following equation (8):

$$J_f = \frac{\partial F}{\partial x} = \begin{bmatrix} 0 & 0 & 0 \\ 0 & 0 & 0 \\ \left(\frac{2\theta}{x_r} - \frac{4y_r - 2\varepsilon}{x_r^3}\right) & \frac{2}{x_r^2} & 0 \end{bmatrix} \quad (8)$$

Subsequently, the calculation utilizing Extended Kalman filter is as shown as follows:

status prediction: $\hat{x}_{k/51\ k-1} = F(\hat{x}_{k-1|k-1}, u_{k-1})$ prediction of co-variance: $P_{k|k-1} = J_{f,k-1}P_{k-1|k-1}J_{f,k-1}^T + Q_{k-1}$ update error: $e_k = z_k - \hat{x}_{k|k-1}$ update error co-variance: $S_k = H_k P_{k|k-1} H_k^T + R_k$ Kalman gain: $K_k = P_{k|k-1} H_k^T S_k^{-1}$ update status: $\hat{x}_{k|k} = \hat{x}_{k|k-1} + K_k e_k$ update co-variance: $P_{k|k} = (I - K_k H_k) P_{k|k-1}$ In this approach, obtain an updated status containing $x_r$ '$y_r$ '$\kappa_2$, namely obtaining an updated curvature $\kappa_2$.

Moreover, as shown in step S18, the descriptive statistics approach is used to calculate the average value of the curvature measured in step S14, and the curvature estimated in step S16, as shown in the following equation (9):

$$\overline{\kappa} = \frac{\sum_{k=1}^{n} \kappa_k}{n} \quad (9)$$

Then calculate the deviation value, to estimate the difference between average curvature and actual curvature, as shown in the following equation (10):

$$\sum_{k=1}^{n}(\kappa_k - \overline{\kappa}) = \sum_{k=1}^{n}\kappa_k - n\overline{\kappa} = 0 \quad (10)$$

After obtaining the deviation, then calculate the variance, as shown in the following equation (11):

$$\begin{aligned} \sigma^2 &= \frac{1}{n}\sum_{k=1}^{n}(\kappa_k - \overline{\kappa})^2 \\ &= \frac{1}{n}\left(\sum_{k=1}^{n}\kappa_k^2 - 2\overline{\kappa}\sum_{k=1}^{n}\kappa_k + \sum_{k=1}^{n}\overline{\kappa}^2\right) \\ &= \frac{1}{n}\left(\sum_{k=1}^{n}\kappa_k^2 - 2n\overline{\kappa}^2 + n\overline{\kappa}^2\right) \\ &= \frac{1}{n}\sum_{k=1}^{n}\kappa_k^2 - \overline{\kappa}^2 \end{aligned} \quad (11)$$

Subsequently, calculate the standard deviation, to estimate deviation between the average curvature and true curvature, as shown in the following equation (12):

$$\sigma_n = \sqrt{\frac{\sum_{k=1}^{n}(\kappa_k - \overline{\kappa})^2}{n}} \quad (12)$$

Afterwards, calculate standard deviation, as long as it is in the range of correct curvature, as shown in the following equation (13):

$$\sigma_{\overline{\kappa}} = \frac{\sigma}{\sqrt{n}} = \sqrt{\frac{\sum_{k=1}^{n}(\kappa_k - \overline{\kappa})^2}{n(n-1)}} \quad (13)$$

Finally, compute the output curvature based on the average curvature and its standard deviation, as shown in the following equation (14):

$$\kappa_c = \overline{\kappa} \pm \sigma_{\overline{\kappa}} \quad (14)$$

where $\kappa_C$ is the output curvature x, and this value is put into $z_k$ in the Extended Kalman filter in step S14, to correct the lane curvature. Finally transmit the lane curvature $\kappa_C$ to the following vehicles, and substitute $\kappa_C$ into $\kappa_2$ of equations (6) and (7), for the next time point to build the traffic lane curvature model as required.

Summing up the above, the present invention provides a lane curvature detection system by utilizing vehicular and inertial sensing signals. It utilizes the vehicle signals of vehicle speed, steering wheel angle, and heading angle from the speed detector, the steering wheel angle sensor, and the driving direction detector, to estimate the curvature of the road and then transmits the eastimation result to the following vehicles. In addition, the result of estimation will not be affected by weather or illumination, so that the system can be operated in an all-weather condition, to achieve raised driving safety.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A lane curvature detection method by utilizing vehicular and inertial sensing signals, comprising following step:
    detecting driving direction, speed information, and steering wheel angle of a vehicle by using a vehicle signal detection module;
    utilizing said driving direction and said speed information detected by the vehicle signal detection module to formulate a lane curvature model in a processor, to estimate lane curvature, and utilizing said speed information and said steering wheel angle detected by the vehicle signal detection module to perform another estimation of said lane curvature; and
    utilizing a descriptive statistics approach to correct said lane curvature,
    wherein said descriptive statistics approach corrects said lane curvature model, for next time of point to estimate said lane curvature.

2. The lane curvature detection method by utilizing vehicular and inertial sensing signals as claimed in claim 1, wherein said corrected lane curvature is transmitted to at least a following vehicle for reference through a wireless transmission module, and that is accomplished through Dedicated Short Range Communication (DSRC).

3. The lane curvature detection method by utilizing vehicular and inertial sensing signals as claimed in claim 1, wherein said lane curvature is obtained through using an extended Kalman filter (EKF) by means of said lane curvature model.

4. The lane curvature detection method by utilizing vehicular and inertial sensing signals as claimed in claim 1, wherein said driving direction is obtained through a driving direction detector, said speed information is obtained through a speed detector, and said steering wheel angle is obtained through a steering wheel angle sensor.

5. The lane curvature detection method by utilizing vehicular and inertial sensing signals as claimed in claim 4, wherein said driving direction detector is a gyroscope or GPS, and said speed detector is a wheel speed meter or an accelerometer or GPS.

6. A lane curvature detection system by utilizing vehicular and inertial sensing signals, comprising:
    a vehicle signal detection module, used to detect driving direction, speed information, and steering wheel angle of a vehicle;
    a processor, connected to said vehicle signal detection module, that utilize said speed information and said driving direction to formulate a lane curvature model to estimate a lane curvature, and that utilizes said speed information and said steering wheel angle to make another estimation of said lane curvature, and then that utilizes a descriptive statistics approach to correct said lane curvature; and
    a wireless transmission module, connected to said processor, to transmit said corrected lane curvature to at least a following vehicle for reference,
    wherein said descriptive statistics approach corrects said lane curvature model, for next time of point to estimate said lane curvature.

7. The lane curvature detection system by utilizing vehicular and inertial sensing signals as claimed in claim 6, wherein said lane curvature is obtained through using an extended Kalman filter (EKF) by means of said lane curvature model.

8. The lane curvature detection system by utilizing vehicular and inertial sensing signals as claimed in claim 6, wherein said vehicle signal detection module further includes a driving direction detector, a speed detector, and a steering wheel angle sensor.

9. The lane curvature detection system by utilizing vehicular and inertial sensing signals as claimed in claim 8, wherein said driving direction detector is a gyroscope or GPS, to detect said driving direction, and said speed detector is a wheel speed sensor, an accelerometer, or GPS, and said steering wheel angle sensor is used to measure said steering wheel angle.

* * * * *